United States Patent [19]

Roberts et al.

[11] Patent Number: 5,134,765
[45] Date of Patent: Aug. 4, 1992

[54] PROCESS OF FORMING A DISPENSING CARTRIDGE

[75] Inventors: John T. Roberts, Clover; Claude E. Monsees; William Z. Vanhook, both of Ft. Mill, all of S.C.

[73] Assignee: Roberts Systems, Inc., Charlotte, N.C.

[21] Appl. No.: 676,267

[22] Filed: Mar. 26, 1991

[51] Int. Cl.⁵ .................. B21F 23/10; B23P 19/00
[52] U.S. Cl. .......................... 29/413; 29/414; 29/417; 29/426.4; 264/148
[58] Field of Search .............. 29/412, 413, 414, 417, 29/426.1, 426.3, 426.4, 426.5; 264/148; 425/308; 156/308.2, 309.6

[56] References Cited

U.S. PATENT DOCUMENTS

| | | | |
|---|---|---|---|
| 3,020,631 | 2/1962 | Kennedy | 29/417 |
| 3,026,569 | 3/1962 | Keller | 264/148 |
| 3,933,560 | 1/1976 | Muttera | 29/417 X |
| 4,662,974 | 5/1987 | Roberts | 156/344 |
| 5,017,320 | 5/1991 | Garcia | 264/148 |

Primary Examiner—Timothy V. Eley
Attorney, Agent, or Firm—Bailey & Hardaway

[57] ABSTRACT

A generally continuous strip of thermoplastic material is deformed into a desired preformed configuration, while retaining continuity with the generally continuous strip to form a chain of the configurations. The chain remains continuous with the generally continuous strip. End portions of the chain are severed so as to form a stack of preformed configurations to be used in the formation of a dispensing cartridge.

11 Claims, 1 Drawing Sheet

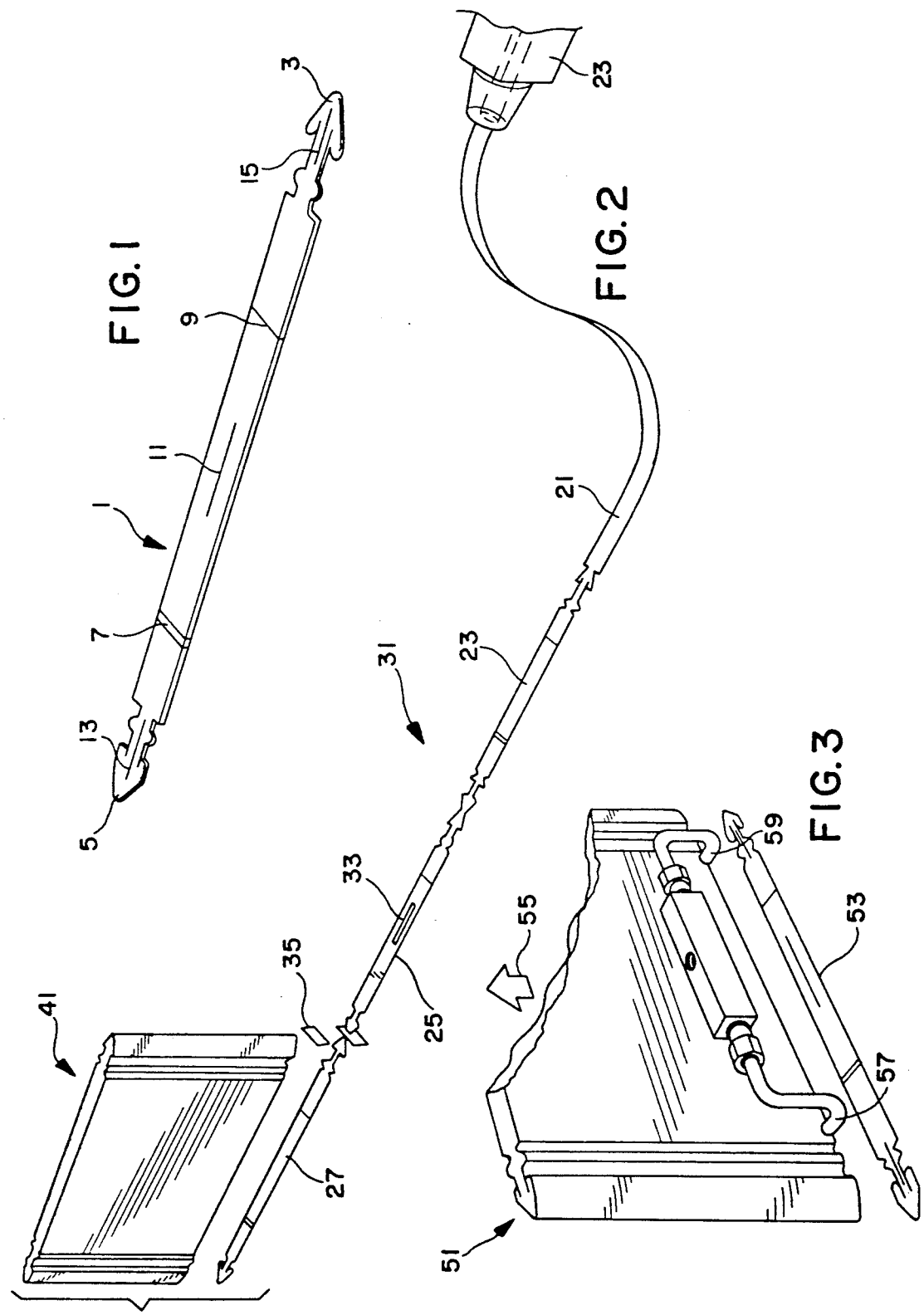

PROCESS OF FORMING A DISPENSING CARTRIDGE

BACKGROUND OF THE INVENTION

This invention relates generally to the art of dispensing and more particularly to the art of preforming individual items to be dispensed.

Prior U.S. Pat. Nos. 4,662,974, 4,946,536, and 4,811,861 describe dispensing cartridges in a process for their formation such that they are generally bonded together. The disclosures of these prior patents are herewith incorporated by reference. Frequently in forming dispensing cartridges of the type described in the above-referenced patents, particular problems are confronted which require variations in the basic process to overcome such problems. The formation of container handles such as that disclosed in co-pending application Ser. No. 07/566,159 brought about the discovery of such problems. The articles to be dispensed on automated equipment in accordance with the formation of containers having handles thereon require that such handles be preformed to have a variety of configurations included therein before being placed into a dispensing cartridge.

SUMMARY OF THE INVENTION

It is thus an object of this invention to provide a novel dispensing cartridge from which a plurality of individual configurations may be dispensed.

It is a further object of this invention to provide such a cartridge for the dispensing of handles for attachment to containers.

It is a further and yet more particular object of this invention to provide such a cartridge wherein a plurality of forming steps are performed upon individual configurations prior to the formation of a dispensing cartridge.

These as well as other objects are accomplished by providing a generally continuous strip of thermoplastic material, deforming portions of the strip into a desired preformed configuration while retaining continuity with the generally continuous strip to form a chain of the configurations, which chain remains continuous with the generally continuous strip and to then sever end portions of the chain so as to form a stack of preformed configurations to be used in the formation of a dispensing cartridge thereof.

BRIEF DESCRIPTION OF THE DRAWINGS

FIG. 1 of the drawings illustrates in perspective view a bayonet handle formed in accordance with this invention.

FIG. 2 of the drawings illustrates in schematic form the process of forming a cartridge in accordance with this invention.

FIG. 3 of the drawings schematically illustrates the process for forming a bonded cartridge in accordance with this invention.

DETAILED DESCRIPTION

In accordance with this invention, it has been found that a dispensing cartridge may be formed of individual items which have preformed very precise configurations therein when formed into a cartridge. It has further been found that this may be carried out from a continuous strip of material which has portions thereof preformed into a desired configuration prior to any severance from the continuous strip such that upon the severance from an end of a preformed chain a dispensing cartridge may be immediately formed therefrom. Various other advantages and features have become apparent from the following description given with reference to the various figures of drawings.

FIG. 1 of the drawings illustrates a preferred form of a configuration 1 in accordance with this invention. As illustrated therein, the preformed configuration 1 is in the form of a bayonet handle such as that described in copending application Ser. No. 07/566,159. The handle 1 has bayonet end portions 3 and 5 for insertion into a container to be retained in a barb-like fashion within the retainer as is described in said copending application. The bayonet handle 1 additionally may have transverse scores 7 and 9 as well as a longitudinal score 11 and a slot such as at 13 and 15. The preformed configuration in accordance with this invention is formed by providing a continuous strip 21 of thermoplastic material. Preferably a high density polyethylene is utilized in accordance with this invention and preferably a recycled polyethylene. The continuous strip 21 is preferably provided by extrusion as is illustrated at 23 wherein the rough polymer is formed into a molten form extruded into the strip configuration which is formed upon the cooling thereof. It has been very desirably found that an extrusion strip possesses the advantage of having a rounded edge which is absent upon a cut strip of material. Thus the extruded strip is considerably more comfortable in the hand of the user because of the blunted edges thereof.

The generally continuous strip of thermoplastic material 21 thus moves along to a deforming station wherein a portion of the strip is deformed into a preformed configuration 23 having any one or all of the preformed characteristics identified with regard to FIG. 1. The preformed configuration is formed without severance from the continuous strip 21. A plurality of preformed configurations such as 25 and 27 are formed so as to be continuous with strip 21 and to thus form a chain having a plurality of preformed configurations which chain is generally referred to by the numeral 31. During the period of continuity, the chain 31 may undergo further forming steps such as the use of additional forming dyes or may be printed so as to have printed indicia such as illustrated at 33 formed thereon.

Only after all forming and marking steps have been performed on chain 31 is a final step of severance performed such as at station 35.

Upon severance at 35, the chain 31 is terminated and a terminal preformed configuration 27 then becomes available for stacking into a cartridge 41. Generally upon severance the terminated preformed configuration 27 is simply moved up to become a part of cartridge 41 and to make way for the trailing preformed configuration 25 which is subsequently severed at station 35.

Preferably a cartridge such as illustrated at 51 in FIG. 3 is bonded so that it may be an integral unit for loading into automated package forming equipment. Generally the cartridge is preferably formed to any desired height by adding additional individual preformed units such as 53 to the bottom of cartridge 51 while moving the cartridge generally in the direction of arrow 55 while applying heat a at 57 and 59 to bond the cartridge. Preferably the heat is in the form of heated air so as to bond the individual preformed to one another without the formation of a discontinuity therein. Such bonding process is described in the above referenced U.S. Patents directed to the formation of a dispensing cartridge. Such cartridges may be formed to any desired height with desirable packaging sizes simply broken from the top of cartridge 51 upon reaching a desirable height.

Thus cartridge 51 ma be utilized in automated dispensing equipment to shear an individual preform such as one from an end portion of the cartridge in automated package forming equipment.

It is thus seen that the process of this invention provides a novel dispensing cartridge. It is further seen that such a process provides a cartridge of bayonet handles having a variety of preformed configurations therein. As many other variations will become apparent to those skilled in the art from a reading of the foregoing specification which is exemplary in nature such variations are embodied within the scope of this invention as defined by the following appended claims.

That which is claimed:

1. A process for forming a dispensing cartridge comprising of the steps of;

providing a generally continuous strip of thermoplastic material;

deforming an end portion of said generally continuous strip to form said strip into a preformed configuration while retaining continuity with said generally continuous strip;

repeating said step of deforming to form a plurality of preformed configurations while retaining continuity of said preformed configurations with said generally continuous strip and to form a chain of preformed configurations with said chain being generally continuous with said generally continuous strip of thermoplastic material;

severing one of said preformed configurations from said chain to terminate said chain with a terminal preform;

continuing to sever the terminal preformed configuration from said chain to form a plurality of terminated preformed configurations; and stacking said terminated preformed configurations to form a cartridge containing a plurality of said terminated preformed configurations.

2. The process according to claim 1 wherein said step of deforming comprises forming scores on said strip.

3. The process according to claim 2 wherein said score is formed in a longitudinal direction of said strip.

4. The process according to claim 2 wherein said score is formed in a direction generally transverse to said continuous strip.

5. The process according to claim 1 wherein said step of deforming comprises forming slots in said strip.

6. The process according to claim 1 wherein said step of deforming comprises severing portions from said preform.

7. The process according to claim 6 wherein said step of severing comprises removing severed plastic material from the perimeter of said strip.

8. The process according to claim 6 wherein said step of severing comprises severing material from an internal portion of said thermoplastic strip.

9. The process according to claim 1 further comprising the step of printing indicia on said strip.

10. The process according to claim 1 further comprising applying heat to said cartridge to bond said terminated preformed configurations to adjacent configurations so as to provide a bonded cartridge.

11. The process according to claim 1 comprising a further step of providing said generally continuous strip of thermoplastic material by extruding molten thermoplastic material to form said strip upon the cooling thereof.

* * * * *